United States Patent
Kemmerer, Jr. et al.

(10) Patent No.: US 10,270,643 B2
(45) Date of Patent: *Apr. 23, 2019

(54) PEER-TO-PEER INTERCONNECTION BETWEEN SERVICE PROVIDERS

(71) Applicant: GENBAND US LLC, Frisco, TX (US)

(72) Inventors: Frederick C. Kemmerer, Jr., Hollis, NH (US); Carroll L. Gray-Preston, Morrisville, NC (US); Jeremy Fuller, Linlithgow (GB)

(73) Assignee: GENBAND US LLC, Plano, TX (US)

( * ) Notice: Subject to any disclaimer, the term of this patent is extended or adjusted under 35 U.S.C. 154(b) by 393 days.

This patent is subject to a terminal disclaimer.

(21) Appl. No.: 15/049,241

(22) Filed: Feb. 22, 2016

(65) Prior Publication Data
US 2016/0173612 A1    Jun. 16, 2016

Related U.S. Application Data

(63) Continuation of application No. 13/838,769, filed on Mar. 15, 2013, now Pat. No. 9,270,516.

(51) Int. Cl.
*H04L 29/06* (2006.01)
*H04L 29/12* (2006.01)
(Continued)

(52) U.S. Cl.
CPC ........ *H04L 29/06326* (2013.01); *H04L 45/42* (2013.01); *H04L 45/58* (2013.01);
(Continued)

(58) Field of Classification Search
CPC ................. H04L 29/06326; H04L 29/06319
See application file for complete search history.

(56) References Cited

U.S. PATENT DOCUMENTS 7,027,582 B2 *   4/2006   Khello ............... H04L 29/1216
                                                    370/259
7,154,901 B2 *  12/2006   Chava .................... H04L 45/00
                                                    370/401
(Continued)

FOREIGN PATENT DOCUMENTS

EP       2337386 A1    6/2011
WO       99/17506 A2   4/1999

OTHER PUBLICATIONS

European Patent Office, "Examination Report," dated Nov. 8, 2018, 7 pages, publisher EPO, Rijswijk, Netherlands.

*Primary Examiner* — Jimmy H Tran
(74) *Attorney, Agent, or Firm* — Fogarty LLP

(57) ABSTRACT

Embodiments of methods and systems for peer-to-peer interconnection between service providers are presented. In one embodiment, a method includes receiving, at a session controller, a request for access to a target communication device, the target communication device being communicatively coupled to a foreign service provider network. The method may also include referencing a list of available routes for peer-to-peer communication with the target communication device on the foreign service provider network from a database of available routes. Additionally, the method may include identifying, in a peer-to-peer interconnect controller, a path for communication with the target communication device in response to the list of available routes. In one embodiment, the method also includes establishing a peer-to-peer communication session from a peering point to the target communication device over the path.

21 Claims, 6 Drawing Sheets

(51) Int. Cl.
  *H04L 12/717* (2013.01)
  *H04L 12/775* (2013.01)
  *H04L 29/08* (2006.01)
  *H04L 12/721* (2013.01)

(52) U.S. Cl.
  CPC ........ *H04L 61/1511* (2013.01); *H04L 67/104* (2013.01); *H04L 67/141* (2013.01); *H04L 45/12* (2013.01); *H04L 61/157* (2013.01)

(56) References Cited

U.S. PATENT DOCUMENTS

| | | | | |
|---|---|---|---|---|
| 7,313,631 | B1* | 12/2007 | Sesmun | H04L 29/12066 370/310 |
| 7,672,267 | B2* | 3/2010 | Tsai | H04L 45/00 370/328 |
| 7,796,616 | B2* | 9/2010 | Kim | H04L 12/4633 370/401 |
| 7,987,506 | B1* | 7/2011 | Khalid | H04L 12/4633 370/401 |
| 8,045,567 | B2* | 10/2011 | Chava | H04L 45/00 370/352 |
| 8,488,447 | B2* | 7/2013 | Bugenhagen | H04L 12/66 370/228 |
| 9,036,509 | B1* | 5/2015 | Addepalli | H04W 4/046 370/259 |
| 9,078,128 | B2* | 7/2015 | Medina | H04L 63/0807 |
| 9,270,516 | B2* | 2/2016 | Kemmerer, Jr. | H04L 61/1511 |
| 9,444,785 | B2* | 9/2016 | Jungck | H04L 29/12066 |
| 9,537,824 | B2* | 1/2017 | Jungck | H04L 29/12066 |
| 9,654,937 | B2* | 5/2017 | Addepalli | H04W 4/046 |
| 2003/0007482 | A1* | 1/2003 | Khello | H04L 29/1216 370/352 |
| 2003/0214955 | A1* | 11/2003 | Kim | H04L 12/4633 370/400 |
| 2004/0156495 | A1* | 8/2004 | Chava | H04L 45/00 379/392 |
| 2004/0196858 | A1* | 10/2004 | Tsai | H04L 45/00 370/401 |
| 2005/0215250 | A1* | 9/2005 | Chava | H04L 45/00 455/433 |
| 2006/0209794 | A1* | 9/2006 | Bae | H04L 12/6418 370/352 |
| 2008/0002670 | A1* | 1/2008 | Bugenhagen | H04L 12/66 370/352 |
| 2008/0162637 | A1* | 7/2008 | Adamczyk | H04L 51/043 709/204 |
| 2009/0168787 | A1* | 7/2009 | Ansari | H04L 12/66 370/401 |
| 2010/0091707 | A1* | 4/2010 | Janneteau | H04W 8/082 370/328 |
| 2010/0103837 | A1* | 4/2010 | Jungck | H04L 29/12066 370/252 |
| 2012/0311686 | A1* | 12/2012 | Medina | H04L 63/0807 726/7 |
| 2013/0263247 | A1* | 10/2013 | Jungck | H04L 29/12066 726/13 |
| 2014/0269537 | A1* | 9/2014 | Kemmerer, Jr. | H04W 80/04 370/329 |
| 2016/0173612 | A1* | 6/2016 | Kemmerer, Jr. | H04L 61/1511 709/228 |

\* cited by examiner

PEER-TO-PEER INTERCONNECTION BETWEEN SERVICE PROVIDERS

CROSS-REFERENCE TO RELATED APPLICATIONS

This is a continuation of U.S. patent application Ser. No. 13/838,769, also entitled Peer-to-Peer Interconnection Between Service Providers, filed Mar. 15, 2013 and issued as U.S. Pat. No. 9,270,516, on Feb. 23, 2016, which is incorporated herein by reference. This application is also related to U.S. patent application Ser. No. 13/841,185 entitled "Determining Peer-to-Peer Communication Paths between Service Providers," filed on Mar. 15, 2013 and issued as U.S. Pat. No. 9,042,235, on May 26, 2015; and Ser. No. 13/840,072 entitled "Direct Routing of Communication Sessions for Mobile IP Communication End Points," filed on Mar. 15, 2013 and issued as U.S. Pat. No. 9,485,707, on Nov. 1, 2016; each of which are incorporated herein by reference in their entirety.

TECHNICAL FIELD

This disclosure relates generally to telecommunications, and more specifically, to methods and systems for peer-to-peer interconnection between service providers.

BACKGROUND

The following discussion sets forth the inventors' own knowledge of certain technologies and/or problems associated therewith. Accordingly, this discussion is not an admission of prior art, and it is not an admission of the knowledge available to a person of ordinary skill in the art.

The telecommunications market includes many different service providers, each typically offering compatible communications services. Compatibility is often required so that customers of one service provider can communicate with friends, family, or other end users who may be customers of another service provider. Although service providers typically offer services that are compatible with other service provider networks, there has not conventionally been a direct connect option between users of diverse service provider networks.

One prior solution for handling interfaces between different service provider networks is conventionally handled by a third party intermediary. The third party intermediary would typically establish an interconnect agreement with many different service providers, and then provide connection services between users of the different service provider networks.

In certain situations, a communication will hop between multiple third parties or across multiple carriers in order to find an agreed path between communication endpoints. In some situations, it is possible to employ direct interconnect between carriers, but it typically requires interconnect agreements to be in place and systems to be configured in advance. In legacy systems, a call may be routed through several carriers before connecting between the end users. Each connection may include connection and/or termination fees. These prior systems become very complex and expensive.

SUMMARY

Embodiments of methods and systems for peer-to-peer interconnection between service providers are presented. In one embodiment, a method includes receiving, at a session controller, a request for access to a target communication device, the target communication device being communicatively coupled to a foreign service provider network. The method may also include referencing a list of available routes for peer-to-peer communication with the target communication device on the foreign service provider network from a database of available routes. Additionally, the method may include identifying, in a peer-to-peer interconnect controller, a path for communication with the target communication device in response to the list of available routes. In one embodiment, the method also includes establishing a peer-to-peer communication session from a peering point to the target communication device over the path.

BRIEF DESCRIPTION OF THE DRAWINGS

Reference will now be made to the accompanying drawings, wherein.

DETAILED DESCRIPTION

Embodiments disclosed herein are directed generally to methods and systems for peer-to-peer interconnection between service providers.

The term "telecommunications," as used herein, is intended to encompass voice communications or telephony, as well as other forms of communications (e.g., video communications, videoconferencing, instant messaging or IM, Short Messaging Service or SMS, emails, etc.) that may take place electronically, for example, over wireless networks, circuit-switched networks, packet-switched networks, or any combination thereof.

Figure 1:
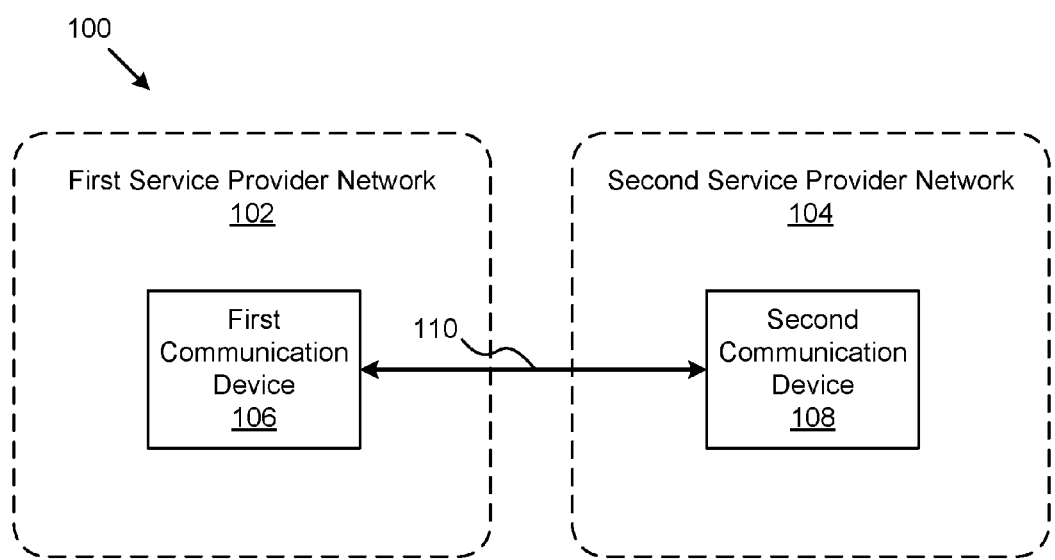
FIG. 1 is a block diagram illustrating one embodiment of a system for peer-to-peer interconnection between service providers.

FIG. 1 is a block diagram illustrating one embodiment of a system for peer-to-peer interconnection between service providers. In one embodiment, the system 100 includes a first service provider network 102 and a second service provider network 104. Examples of service providers include, but are not limited to, AT&T®, Verizon®, Vodafone™, etc. In one embodiment, the provider networks 102 may be the networks may be packet-switched, circuit-switched, wireless, or any combination thereof. In general embodiments, a first communication device 106 on the first service provider network 102 may be configured to communicate with a second communication device 108 on a second service provider network 104 over a peer-to-peer communication interconnection path 110 between the first service provider network 102 and the second service provider network 104. In one embodiment, first communication device 106 and second communication device 108 are user communication devices (e.g., telephones, mobile phones, laptops, tablet computers, etc.) for a user who is a subscriber of the first service provider network 102 and second service provider network 104 respectively. As used herein, the term "foreign service provider" means a different service provider network than one that a user subscribes to (e.g., second service provider network 104 as to first communication device 106 in FIGS. 1-2).

Beneficially, such an embodiment may enable the first communication device 106 to initiate, negotiate, and carry out communications with the second communication device 108 without requiring a central route lookup function or an administrator. More specifically, certain embodiments may eliminate use of centralized or third-party interconnection sources, and the associated expenses of routing and relating number lookup information. Thus, use of such centralized or third-party interconnection sources by the service providers 102,104 is not required for enabling communication between devices 106,108. Further benefits may include elimination of class 4 interconnection elements in existing network infrastructures.

Figure 2:
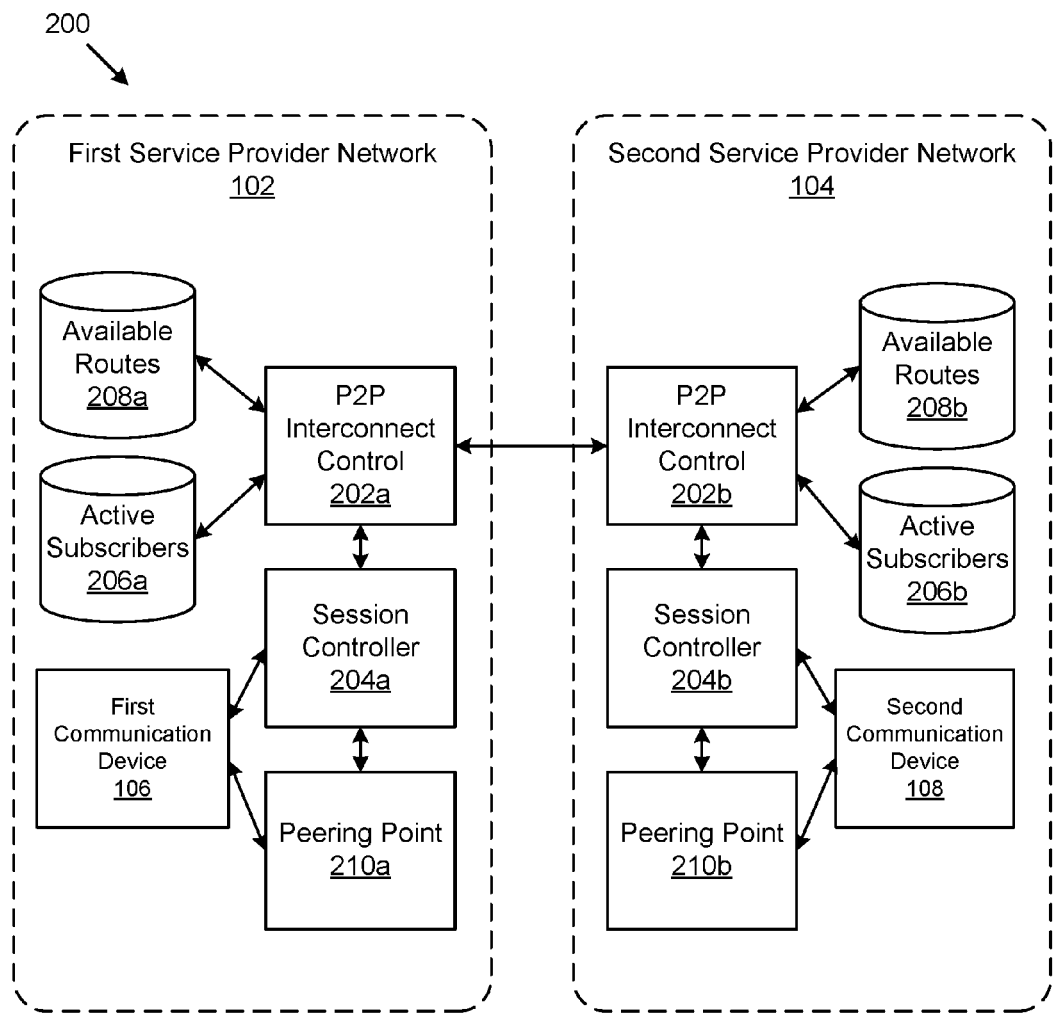
FIG. 2 is a block diagram illustrating another embodiment of a system for peer-to-peer interconnection between service providers.

FIG. 2 is a block diagram illustrating another embodiment of a system 200 for peer-to-peer interconnection between service providers. As in FIG. 1, system 200 may also include a first service provider network 102 and a second service provider network 104, each providing user connectivity to a first communication device 106 and second communication device 108 respectively. In addition, the system 200 may include a peer-to-peer interconnect control 202*a-b*, and a session controller 204*a-b*.

Peer-to-peer interconnect control 202 may be configured to access and query active subscribers database 206 and available routes database 208. In one embodiment, each of the first service provider network 102 and the second service provider network 104 each maintain an active subscribers database 206*a,b* and an available routes database 208*a,b* respectively for storing connectivity information for the local network. For example, an identifier associated with first communication device 106 may be stored in active subscribers database 206*a*, which is maintained by first service provider network 102. Similarly, available routes database 208*a* may store a listing of available connection routes for accessing first communication device 106. Likewise, the active subscribers database 206*b* and available routes database 208*b* maintained by second service provider network 104 may include information for connecting to second communication device 108.

Peer-to-Peer interconnect control 202*a* may handle coordination of peer-to-peer communication routing for all devices on first service provider network 102. In one embodiment, peer-to-peer interconnect control 202*a* may be a communication interface to second service provider network 104 and other service provider networks. Session controller 204*a* may be in communication with peer-to-peer control 202*a*, and may serve as an internal interface to first communication device 106. Peering point 210*a* may handle device-to-device communication between the first communication device 106 and the second communication device 108 once the peer-to-peer link has been negotiated and routed by peer-to-peer interconnect control 202*a*.

Thus, in a simplified view, the peer-to-peer interconnect control 202*a* negotiates and routes peer-to-peer communication links between service provider networks, session controller 204*a* handles intra-network interfaces between devices, and peering point 210*a* handles content communication between service provider networks once the link has been established by peer-to-peer interconnect control 202*a*.

One of ordinary skill in the art will recognize that each of the corresponding devices in the second service provider network have a similar and corresponding function.

Figure 3:
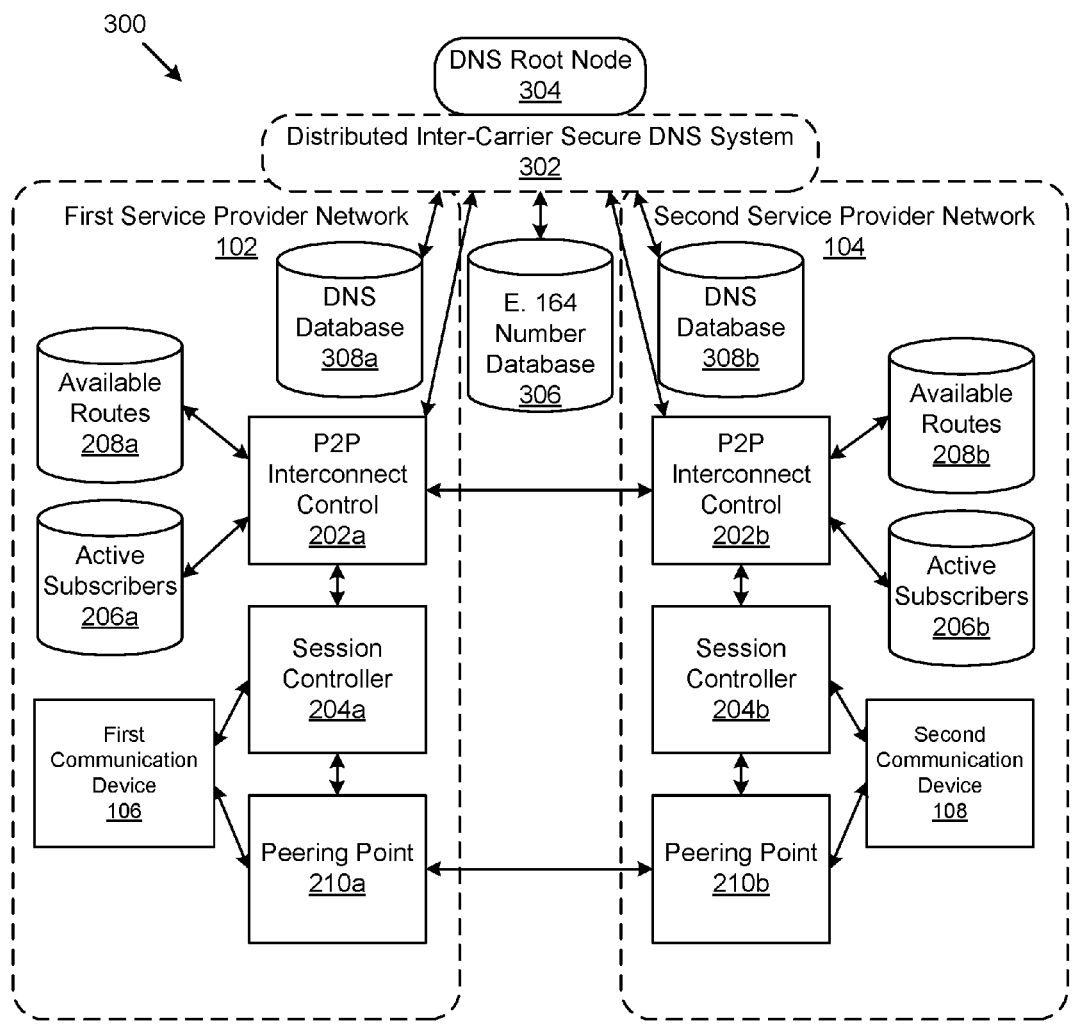
FIG. 3 is a block diagram illustrating another embodiment of a system for peer-to-peer interconnection between service providers.

FIG. 3 is a block diagram illustrating another embodiment of a system 300 for peer-to-peer interconnection between service providers 102-104. The embodiment of FIG. 3 illustrates additional components which may facilitate peer-to-peer interconnection between service provider networks. In addition to the components described in FIGS. 1-2, the embodiment of FIG. 3 includes a Distributed Inter-Carrier Secure DNS System (DICSDS) 302, a DNS root node 304, and an E.164 Number (ENUM) database 306. In addition, each service provider network may include a DNS database 308*a,b* respectively.

In one embodiment, DICSDS 302 may be a common DNS system among service providers and E.164 providers. In one embodiment, DNS name resolution data may be controlled by the owning service provider via their local segment of the DICSDS 302. In one embodiment, DICSDS 302 may facilitate address lookup for interface nodes within service provider networks. For example, peer-to-peer interconnect control 202*a* on the first service provider network 102 may query DICSDS 302 to determine an address for P2P interconnect control 202*b* on the second service provider network 104 in order to initiate P2P route negotiations.

ENUM database 306 may contain a commonly accessible list of ENUM identifiers, which DICSDS 302 may access in response to a query from a P2P interconnect control 202. ENUM database 306 enables E.164 number to Service Provider mapping via DNS. DNS root node 304 enables the first service provider 102 and the second service provider 104 to create a common DNS system, such that both service providers have access to common address data.

Figure 4:
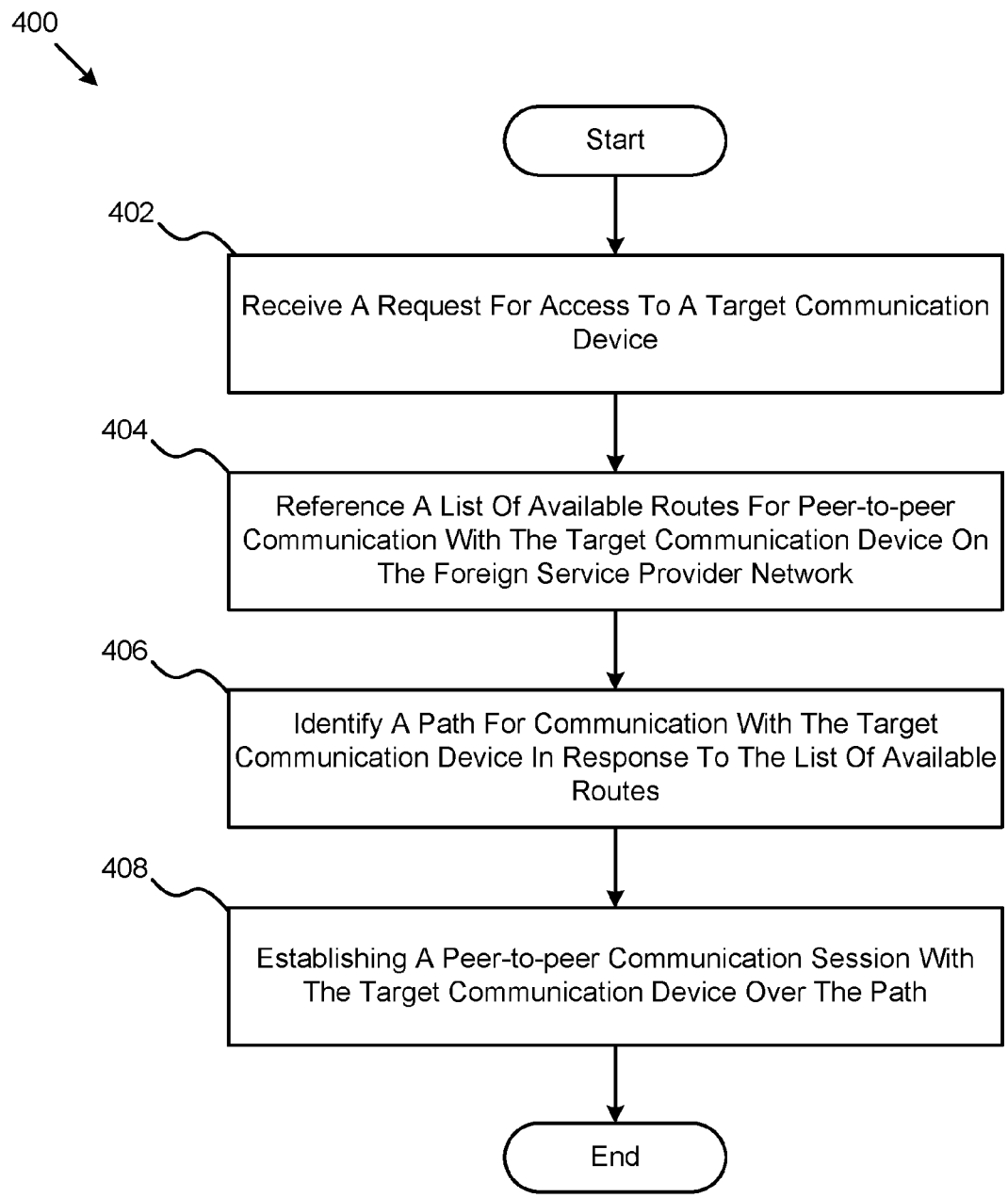
FIG. 4 is a flowchart of a method for peer-to-peer interconnection between service providers.

FIG. 4 is a flowchart of a method 400 for peer-to-peer interconnection between service providers 102, 104. In one embodiment, the method 400 starts when the session controller 204*a* receives a request for access to a target communication device, the target communication device being communicatively coupled to a foreign service provider network as shown at block 402. For example, the session controller 204*a* may receive a request from the first communication device 106 to access the second communication device on the second service provider network.

In one embodiment, the peer-to-peer interconnect controller 202*a* may reference a list of available routes for peer-to-peer communication with the target communication device on the foreign service provider network as shown in block 404. For example, session controller 204*a* may forward the request to P2P interconnect control 202*a*, which contacts P2P interconnect control 202*b* on the second service provider network and request access to available route information for accessing second communication device 108.

Additionally P2P interconnect control 202*a* may identify a path for communication with the target communication device in response to the list of available routes as shown at block 406. For example, P2P interconnect control 202*b* may forward available communication routes to P2P interconnect control 202*a*. The available communication routes may include one or more communication paths to second communication device 108, which are stored in available routes database 208*b* on the second service provider network 104.

In one embodiment, peering point 210*a* may establish a peer-to-peer communication session with the target communication device over the path as shown in block 408. For example, once a communication path to second communication device 108 is identified and a P2P link is negotiated, peering point 210a may interface peering point 210b on the second service provider network 104 and communicate content between the first communication device 106 and the second communication device 108.

Figure 5:
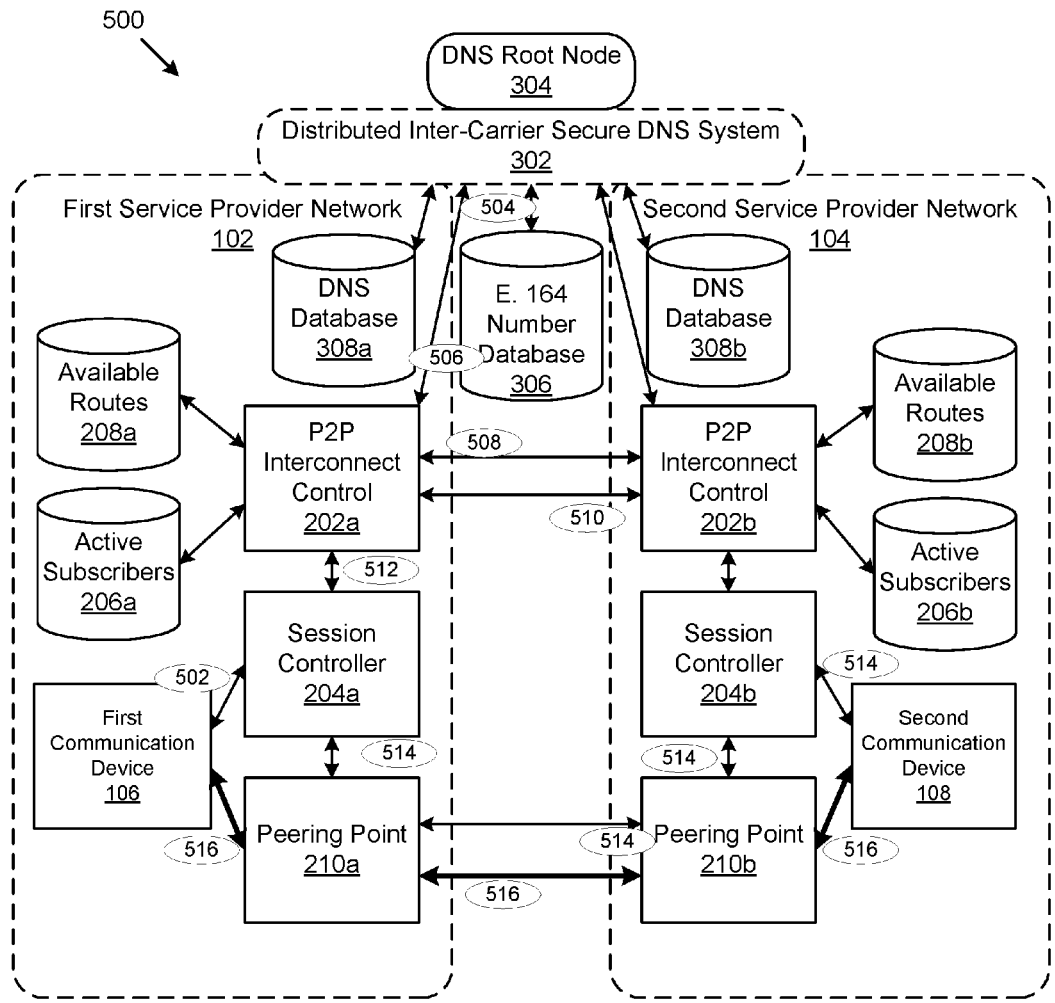
FIG. 5 is a system state diagram illustrating one embodiment of a method for peer-to-peer interconnection between service providers.

FIG. 5 is a system state diagram illustrating one embodiment of a method 500 for peer-to-peer interconnection between service providers. In one embodiment the method 500 starts when first communication device 106 initiates, at state 502, a session to second communication device 108. In the depicted embodiment, first communication device 106 is a subscriber on first service provider network 102 and second communication device is a subscriber on second service provider network 104. More specifically, first communication device 106 may send a request to session controller 204a as shown by state 502.

At state 504, P2P interconnect control 202a may perform an ENUM query to look up the identity of the second service provider 104. Additionally, as shown at state 506, the P2P interconnect control 202a may query the DNS route server to obtain the Name Server address where the address of P2P interconnect control 202b for second service provider network 104 can be obtained and obtain the node address for P2P interconnect control 202b.

At state 508, P2P interconnect control 202a of the first service provider network 102 may contact P2P interconnect control 202b of the second service provider network 104 to confirm that P2P interconnect services are supported by second service provider network 104. Additionally, P2P interconnect control 202a may obtain any redirect information due to roaming through query of Active Subscriber Database and provide the route record of the closest peering point to the subscriber. If, in one embodiment, it is determined that the service provider of the called party does not support certain embodiments, then the system may fall-back to traditional routing.

At state 510, P2P interconnect control 202b to may query available routes database 208b to identify available routes to second communication device 108 and return the available routes to P2P interconnect control 202a on the first service provider network 102. At state 512, P2P interconnect control 202a may use the available route information to select a route to peering point 210b, which may render a Session Detail Record (SDR) for accounting use at the end of the session. At state 514, session controller 204a may establish signaling between peering point 210a and remote peering point 210b using the selected route. At state 516, a media path may be established between peering point 210a and peering point 210b, which enables the first communication device 106 to communicate content with second communication device 108.

Figure 6:
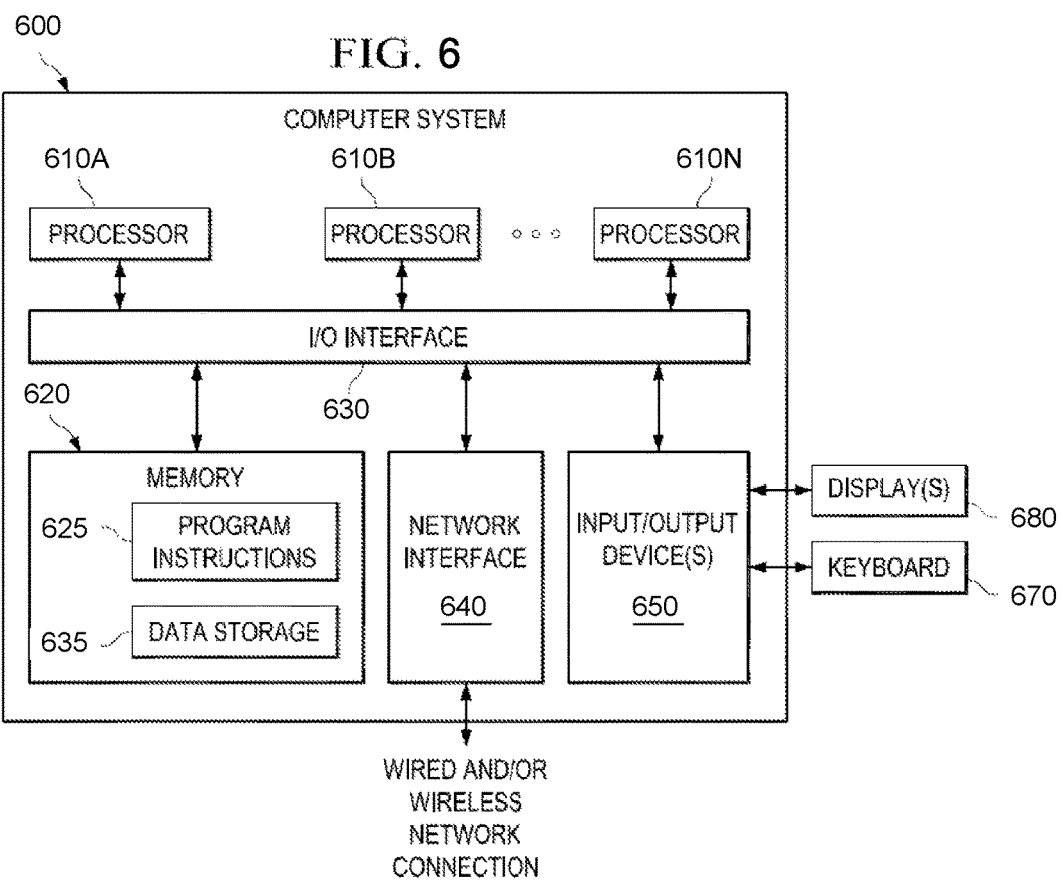
FIG. 6 is a block diagram of a computer system configured to implement various systems and methods described herein according to some embodiments.

As noted above, embodiments of peer-to-peer interconnection between service providers may be implemented or executed, at least in part, by one or more computer systems. One such system is illustrated in FIG. 6. In various embodiments, system 600 may be a server, a workstation, a desktop computer, a laptop, a tablet computer, a mobile device, a smart phone, or the like. In some cases, system 600 may be used to implement communication devices 101 and/or 102, and application server(s) 105 shown in FIG. 1. As illustrated, computer system 600 includes one or more processor(s) 610A-N coupled to a system memory 620 via an input/output (I/O) interface 630. Computer system 600 further includes a network interface 640 coupled to I/O interface 630, and one or more input/output devices 650 (e.g., a Bluetooth® adaptor, a Wifi adaptor, or the like), keyboard 670, and display(s) 680.

In various embodiments, computer system 600 may be a single-processor system including one processor 610A (e.g., processor 201 shown in FIG. 2), or a multi-processor system including two or more processors 610A-N (e.g., two, four, eight, or another suitable number). Processor(s) 610A-N may include any processor capable of executing program instructions. For example, in various embodiments, processor(s) 610A-N may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processor(s) 610A-N may commonly, but not necessarily, implement the same ISA. Also, in some embodiments, at least one processor 610A may be a graphics processing unit (GPU) or other dedicated graphics-rendering device.

System memory 620 may be configured to store program instructions (e.g., algorithms for querying databases, accessing foreign service provider networks, etc.) and/or data accessible by processor(s) 610A-N. In various embodiments, system memory 620 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as, for example, those described in connection with FIGS. 4-8, may be stored within system memory 620 as program instructions 625 and data storage 635, respectively. Additionally or alternatively, methods described herein may be implemented as a software program that is stored within system memory 620 and is executable by processor(s) 610A-N. In other embodiments, program instructions and/or data may be received, sent or stored upon different types of computer-accessible media or on similar media separate from system memory 620 or computer system 600. Generally speaking, a computer-accessible medium may include any tangible or non-transitory storage media or memory media such as electronic, magnetic, or optical media—e.g., disk or CD/DVD-ROM coupled to computer system 600 via I/O interface 630. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, I/O interface 630 may be configured to coordinate I/O traffic between processor(s) 610A-N, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor(s) 610A-A-N). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. In addition, in some embodiments some or all of the functionality of I/O interface 630, such as an interface to system memory 620, may be incorporated directly into processor(s) 610A-N.

Network interface 640 may be configured to allow data to be exchanged between computer system 600 and other devices attached to a network (e.g., telecommunications network 104 of FIG. 1), such as other computer systems, or between nodes of computer system 600. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre-Channel SANs, or via any other suitable type of network and/or protocol.

Input/output devices 650 may, in some embodiments, include one or more display terminals, keyboards, keypads, touchpads, scanning devices, RFID readers, NFC readers, voice or optical recognition devices, or any other devices suitable for entering or retrieving data by one or more computer system 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

As shown in FIG. 6, memory 620 may include program instructions 625, configured to implement certain embodiments described herein, and data storage 635, comprising various data may be accessible by program instructions 625. In an embodiment, program instructions 625 may include software elements of embodiments illustrated in the above figures. For example, program instructions 625 may be implemented in various embodiments using any desired programming language, scripting language, or combination of programming languages and/or scripting languages (e.g., C, C++, C#, Java™, JavaScript™, Perl, etc.). Data storage 635 may include data that may be used in these embodiments (e.g., recorded communications, profiles for different modes of operations, etc.). In other embodiments, other or different software elements and data may be included.

A person of ordinary skill in the art will appreciate that computer system 600 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system or processor-based configurations.

Although certain embodiments are described herein with reference to specific examples, numerous modifications and changes may be made in light of the foregoing description. Accordingly, the specification and figures are to be regarded in an illustrative rather than a restrictive sense, and all such modifications are intended to be included within their scope. Any benefits, advantages, or solutions to problems that are described herein with regard to specific embodiments are not to be construed as a critical, required, or essential feature or element of any or all the claims. Furthermore, it should be understood that the various operations described herein may be implemented in software, hardware, or a combination thereof. The order in which each operation of a given technique is performed may be changed, and the elements of the systems illustrated herein may be added, reordered, combined, omitted, modified, etc. It is intended that the embodiments described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The term "coupled" is defined as "connected" and/or "in communication with," although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method, comprising:
   receiving, at a session controller, a request for access to a target communication device, the target communication device being communicatively coupled to a foreign service provider network;
   referencing a list of available routes for peer-to-peer communication with the target communication device on the foreign service provider network from a database of available routes;
   identifying, in a peer-to-peer interconnect controller separate from the requesting device, a path for communication with the target communication device in response to the list of available routes; and
   establishing a peer-to-peer communication session from a peering point associated with and separate from the requesting device to the target communication device, over the path.

2. The method of claim 1, wherein referencing the list of available routes does not include a central route lookup function.

3. The method of claim 1, wherein the list of available routes is stored, at least in part, in a database of available routes maintained on a home service provider network.

4. The method of claim 1, further comprising performing an E.164 Number query to identify the foreign service provider network.

5. The method of claim 1, further comprising querying a Domain Name System (DNS) server to identify a network address for a peer-to-peer interconnect control node associated with the foreign service provider network.

6. The method of claim 5, wherein referencing a list of available routes for peer-to-peer communication with the target communication device and/or identifying the path for communication with the target communication device further comprises querying the peer-to-peer interconnect control node associated with the foreign service provider network to identify routing information for reaching the target communication device.

7. The method of claim 6, wherein the routing information comprises a list of available routes stored in a database of available routes maintained on the foreign service provider network.

8. The method of claim 6, further comprising rendering a Session Detail Record (SDR) for route use in response to the information for reaching the target communication device.

9. The method of claim 1, wherein establishing the peer-to-peer communication session further comprises establishing a signaling session directly between a peering point on the foreign service provider network and the peering point associated with the requesting device on a home service provider network.

10. The method of claim 1, wherein establishing the peer-to-peer communication session further comprises establishing a media path to the target communication device.

11. A system, comprising:
a session controller node comprising at least one processor and a memory coupled to the processor and storing program instructions that upon execution by the processor cause the session controller node to receive a request for access to a target communication device, the target communication device being communicatively coupled to a foreign service provider network;
a peer-to-peer interconnect controller node, coupled to the session controller node and separate from a requesting device, comprising at least one processor coupled to the processor and a memory storing program instructions that upon execution by the processor cause the peer-to-peer interconnect controller node to:
reference a list of available routes for peer-to-peer communication with the target communication device on the foreign service provider network; and
identify a path for communication with the target communication device in response to the list of available routes; and
a peering point, separate from the requesting device and coupled to the session controller node, comprising at least one processor and a memory coupled to the processor and storing program instructions that upon execution by the processor cause the peering point to establish a peer-to-peer communication session with the target communication device over the path.

12. The system of claim 11, wherein referencing the list of available routes does not include a central route lookup function.

13. The system of claim 11, further comprising an available routes database on a home service provider network, the available routes database configured to store at least a part of the list of available routes.

14. The system of claim 11, further comprising an E.164 Number database configured to store information for identifying the foreign service provider network.

15. The system of claim 11, further comprising a Domain Name System (DNS) server configured to identify a network address for a peer-to-peer interconnect control node associated with the foreign service provider network.

16. The system of claim 11, further comprising a peer-to-peer interconnect control node associated with the foreign service provider network configured to identify routing information for reaching the target communication device.

17. The system of claim 16, further comprising a database of available routes maintained on the foreign service provider network configured to store the routing information comprising a list of the available routes.

18. The system of claim 16, further comprising a peer-to-peer interconnect control associated with the foreign service provider network configured to render a Session Detail Record (SDR) for accounting use in response to the information for reaching the target communication device.

19. The system of claim 11, wherein establishing the peer-to-peer communication session further comprises establishing a signaling session directly between a peering point on the foreign service provider network and the peering point coupled to the session controller on a home service provider network.

20. The system of claim 11, wherein establishing a peer-to-peer communication session further comprises establishing a media path to the target communication device.

21. A tangible computer-readable storage medium having program instructions stored thereon that, upon execution by a computer system, causes the computer system to:
receive a request from a requesting communication device separate from the computer system for access to a target communication device, the target communication device being communicatively coupled to a foreign service provider network;
reference a list of available routes for peer-to-peer communication with the target communication device on the foreign service provider network;
identify a path for communication with the target communication device in response to the list of available routes; and
establish a peer-to-peer communication session from a peering point associated with and separate from the requesting device in a home service provider network with the target communication device, over the path.

* * * * *